United States Patent
Maruta

(10) Patent No.: US 11,611,385 B2
(45) Date of Patent: Mar. 21, 2023

(54) BASE STATION, SYSTEM, METHOD, AND NON-TRANSITORY COMPUTER READABLE MEDIUM

(71) Applicant: NEC Corporation, Tokyo (JP)

(72) Inventor: Yasushi Maruta, Tokyo (JP)

(73) Assignee: NEC CORPORATION, Tokyo (JP)

(*) Notice: Subject to any disclaimer, the term of this patent is extended or adjusted under 35 U.S.C. 154(b) by 29 days.

(21) Appl. No.: 17/277,018

(22) PCT Filed: Jun. 11, 2019

(86) PCT No.: PCT/JP2019/023061
§ 371 (c)(1),
(2) Date: Mar. 17, 2021

(87) PCT Pub. No.: WO2020/066143
PCT Pub. Date: Apr. 2, 2020

(65) Prior Publication Data
US 2022/0038166 A1    Feb. 3, 2022

(30) Foreign Application Priority Data

Sep. 26, 2018  (JP) .............................. JP2018-180606

(51) Int. Cl.
*H04B 7/06*    (2006.01)
*H04B 17/345*  (2015.01)
*H04B 7/0452*  (2017.01)

(52) U.S. Cl.
CPC ......... *H04B 7/0697* (2013.01); *H04B 7/0452* (2013.01); *H04B 17/345* (2015.01)

(58) Field of Classification Search
CPC .. H04B 7/0697; H04B 7/0452; H04B 17/345; H04B 17/12; H04W 52/242; H04W 16/28; Y02D 30/70
See application file for complete search history.

(56) References Cited

U.S. PATENT DOCUMENTS

2006/0007890 A1* 1/2006 Yokoyama ............. H04B 7/086
                                                                   370/342
2009/0279486 A1* 11/2009 Kishigami ........... H04B 7/0695
                                                                   370/329

(Continued)

FOREIGN PATENT DOCUMENTS

JP    2010-28737 A    2/2010
JP    2011-188446 A   9/2011

(Continued)

OTHER PUBLICATIONS

International Search Report for PCT Application No. PCT/JP2019/023061, dated Sep. 3, 2019.

(Continued)

*Primary Examiner* — Atique Ahmed

(57) ABSTRACT

An object of the present disclosure is to provide a base station, a system, a method, and a program capable of improving DL MU-MIMO characteristics. A base station according to the present disclosure includes: a calculation unit that calculates a spatial multiplexing antenna weight $V_{JL}$ of each of a plurality of antennas owned by the base station based on information about at least one spatial multiplexing terminal and Down Link (DL) channel information of the at least one spatial multiplexing terminal; and an interference elimination unit that calculates an interference elimination antenna weight $W_{JL}$ that reduces interference power with respect to other terminals to a desired level or lower based on the spatial multiplexing antenna weight $V_{JL}$, and calculates a desired signal power loss $PL_{JL}$ of the at least one spatial multiplexing terminal based on the spatial multiplexing antenna weight $V_{JL}$ and the interference elimination antenna weight $W_{JL}$.

8 Claims, 4 Drawing Sheets

(56) References Cited

U.S. PATENT DOCUMENTS

| | | | |
|---|---|---|---|
| 2010/0214964 A1* | 8/2010 | Larsson | H04B 7/0417 |
| | | | 455/63.1 |
| 2011/0150059 A1* | 6/2011 | Cedergren | H04L 25/067 |
| | | | 375/224 |
| 2013/0012222 A1* | 1/2013 | Zhu | H04W 48/20 |
| | | | 455/452.1 |
| 2013/0343235 A1* | 12/2013 | Khan | H04B 7/10 |
| | | | 370/278 |
| 2017/0048874 A1 | 2/2017 | Huang et al. | |
| 2017/0331670 A1* | 11/2017 | Parkvall | H04J 11/0056 |
| 2017/0366311 A1* | 12/2017 | Iyer | H04L 5/0007 |
| 2018/0212652 A1* | 7/2018 | Thomas | H04B 7/0617 |
| 2019/0082337 A1* | 3/2019 | Gheorghiu | H04L 5/001 |

FOREIGN PATENT DOCUMENTS

| | | |
|---|---|---|
| JP | 2013-062585 A | 4/2013 |
| JP | 2013-135426 A | 7/2013 |
| JP | 2013-214899 A | 10/2013 |
| JP | 2016-167776 A | 9/2016 |
| JP | 2017-522753 A | 8/2017 |

OTHER PUBLICATIONS

Japanese Office Communication for JP Application No. 2020-547969 dated Apr. 12, 2022 with English Translation.

* cited by examiner

BASE STATION, SYSTEM, METHOD, AND NON-TRANSITORY COMPUTER READABLE MEDIUM

This application is a National Stage Entry of PCT/JP2019/023061 filed on Jun. 11, 2019, which claims priority from Japanese Patent Application 2018-180606 filed on Sep. 26, 2018, the contents of all of which are incorporated herein by reference, in their entirety.

TECHNICAL FIELD

The present disclosure relates to a base station, a system, a method, and a program, and in particular, to a base station, a system, a method, and a program capable of improving Down Link Multi User-Multiple Input Multiple Output (DL MU-MIMO) characteristics.

BACKGROUND ART

When a base station including a multi-element antenna performs DL MU-MIMO, it determines to which terminal (layer) a radio resource is allocated to perform spatial multiplexing based on DL channel information of terminals that communicate with the base station. When the base station determines to which terminal a radio resource is allocated to perform spatial multiplexing, it is difficult to obtain an optimum solution from among all the terminals connected to the base station. As a method for obtaining an optimum solution, for example, the base station extracts a combination in which "the total number of layers≤the maximum number of spatial multiplexing layers of the base station" from among all the terminals connected to the base station. The base station calculates a cross-correlation of the DL channels in the radio resource with respect to the extracted combination and selects the combination having the lowest cross-correlation. By the above-described method, the base station can obtain an optimum solution for determining to which terminal the radio resource is allocated to perform spatial multiplexing. However, the above-described method requires a large amount of computation, and thus a scale of a circuit becomes large and a long processing time is required.

Meanwhile, a random selection method for randomly selecting a spatial multiplexing terminal that performs spatial multiplexing in order to reduce an amount of computation, a scale of a circuit, and a processing time can be employed, although it is not a method for obtaining an optimum solution. The random selection method requires a smaller amount of computation, a smaller scale of a circuit, and a shorter processing time than those required for the method for obtaining an optimum solution. However, in the random selection method, for example, when a terminal geographically adjacent to the base station is selected as a spatial multiplexing terminal, the cross-correlation of the DL channels becomes high. Therefore, in order to reduce interference power with respect to another terminal adjacent to the base station by a DL beam and to satisfy a predetermined communication quality with respect to this terminal, it is necessary to increase DL transmission power of the base station as compared to the case where the terminal geographically adjacent to the base station is not selected as a spatial multiplexing terminal. In such a case, the base station cannot allocate sufficient transmission power to this terminal, because the total transmission power of the base station has an upper limit. Alternatively, in the base station, transmission power to other terminals that perform spatial multiplexing is reduced. Thus, the DL MU-MIMO characteristics are degraded. Specifically, a Signal to Interference Ratio (SIR), a DL communication quality, a throughput, and the like are reduced.

Patent Literature 1 discloses a beam control method for controlling a beam weight for determining a directivity of a beam transmitted from a base station to a plurality of radio terminals by using a plurality of antennas, the beam control method including: a step of estimating a communication quality of a transmission path between each of the plurality of radio terminals and the base station; a first determination step of determining at least one first beam weight required for at least one first radio terminal having the communication quality equal to or lower than a predetermined level to receive the beam in association with each of the at least one first radio terminal; a determination step of determining whether a radio terminal having the communication quality higher than the predetermined level can receive a first beam generated by using any one of the at least one first beam weight; a second determination step of determining at least one second beam weight required for at least one second radio terminal that cannot receive the first beam to receive the beam in association with the at least one second radio terminal; and a selection step of selecting a plurality of beam weights from among the at least one first beam weight and the at least one second beam weight. Patent Literature 1 fails to disclose that a desired signal power loss of each spatial multiplexing terminal is calculated based on a spatial multiplexing antenna weight and an interference elimination antenna weight and then a terminal with excess loss in which the calculated desired signal power loss is greater than a power loss threshold is excluded from the spatial multiplexing terminals.

CITATION LIST

Patent Literature

Patent Literature 1: Japanese Unexamined Patent Application Publication No. 2016-167776

SUMMARY OF INVENTION

Technical Problem

As described above, in a case where the base station performs DL MU-MIMO with terminals, there is a problem that the DL MU-MIMO characteristics are degraded when spatial multiplexing terminals that perform spatial multiplexing are selected by a method other than a method for obtaining an optimum solution in order to reduce an amount of computation, a scale of a circuit, and a processing time.

An object of the present disclosure is to provide a base station, a system, a method, and a program that solve any of the above-described problems.

Solution to Problem

A base station according to the present disclosure includes:

a calculation unit configured to calculate, in a certain radio resource, a spatial multiplexing antenna weight of each of a plurality of antennas owned by the base station based on information about at least one spatial multiplexing terminal configured to perform spatial multiplexing and Down Link (DL) channel information of the at least one spatial multiplexing terminal;

an interference elimination unit configured to calculate an interference elimination antenna weight that reduces interference power with respect to a terminal other than the at least one spatial multiplexing terminal to a desired level or lower based on the spatial multiplexing antenna weight, and calculate a desired signal power loss of the at least one spatial multiplexing terminal based on the spatial multiplexing antenna weight and the interference elimination antenna weight;

a selection unit configured to exclude a terminal with excess loss in which the desired signal power loss is greater than a power loss threshold from the at least one spatial multiplexing terminal; and a transmission unit configured to transmit a signal to the at least one spatial multiplexing terminal.

A system according to the present disclosure includes a base station and at least one spatial multiplexing terminal configured to perform spatial multiplexing with the base station, in which the base station includes:
  a calculation unit configured to calculate, in a certain radio resource, a spatial multiplexing antenna weight of each of a plurality of antennas owned by the base station based on information about the at least one spatial multiplexing terminal and Down Link (DL) channel information of the at least one spatial multiplexing terminal;
  an interference elimination unit configured to calculate an interference elimination antenna weight that reduces interference power with respect to a terminal other than the at least one spatial multiplexing terminal to a desired level or lower based on the spatial multiplexing antenna weight, and calculate a desired signal power loss of the at least one spatial multiplexing terminal based on the spatial multiplexing antenna weight and the interference elimination antenna weight;
  a selection unit configured to exclude a terminal with excess loss in which the desired signal power loss is greater than a power loss threshold from the at least one spatial multiplexing terminal; and
  a transmission unit configured to transmit a signal to the at least one spatial multiplexing terminal, and
the at least one spatial multiplexing terminal includes:
  a generation unit configured to generate the DL channel information based on DL control information received from the base station; and
  a transmission unit configured to transmit the DL channel information to the base station.

A method according to the present disclosure includes:
  calculating, in a certain radio resource, a spatial multiplexing antenna weight of each of a plurality of antennas owned by a base station based on information about at least one spatial multiplexing terminal configured to perform spatial multiplexing and Down Link (DL) channel information of the at least one spatial multiplexing terminal;
  calculating an interference elimination antenna weight that reduces interference power with respect to a terminal other than the at least one spatial multiplexing terminal to a desired level or lower based on the spatial multiplexing antenna weight;
  calculating a desired signal power loss of the at least one spatial multiplexing terminal based on the spatial multiplexing antenna weight and the interference elimination antenna weight;
  excluding a terminal with excess loss in which the desired signal power loss is greater than a power loss threshold from the at least one spatial multiplexing terminal; and
  transmitting a signal to the at least one spatial multiplexing terminal.

A program according to the present disclosure causes a computer to:
  calculate, in a certain radio resource, a spatial multiplexing antenna weight of each of a plurality of antennas owned by a base station based on information about at least one spatial multiplexing terminal configured to perform spatial multiplexing and Down Link (DL) channel information of the at least one spatial multiplexing terminal;
  calculate an interference elimination antenna weight that reduces interference power with respect to a terminal other than the at least one spatial multiplexing terminal to a desired level or lower based on the spatial multiplexing antenna weight;
  calculate a desired signal power loss of the at least one spatial multiplexing terminal based on the spatial multiplexing antenna weight and the interference elimination antenna weight;
  exclude a terminal with excess loss in which the desired signal power loss is greater than a power loss threshold from the at least one spatial multiplexing terminal; and
  transmit a signal to the at least one spatial multiplexing terminal.

Advantageous Effects of Invention

According to the present disclosure, it is possible to provide a base station, a system, a method, and a program capable of improving Down Link Multi User-Multiple Input Multiple Output (DL MU-MIMO) characteristics.

DESCRIPTION OF EMBODIMENTS

An example embodiment according to the present disclosure will be described hereinafter with reference to the drawings. The same components are denoted by the same reference signs throughout the drawings and redundant descriptions will be omitted as appropriate.

EXAMPLE EMBODIMENT

A base station according to an example embodiment is described.

Figure 1:
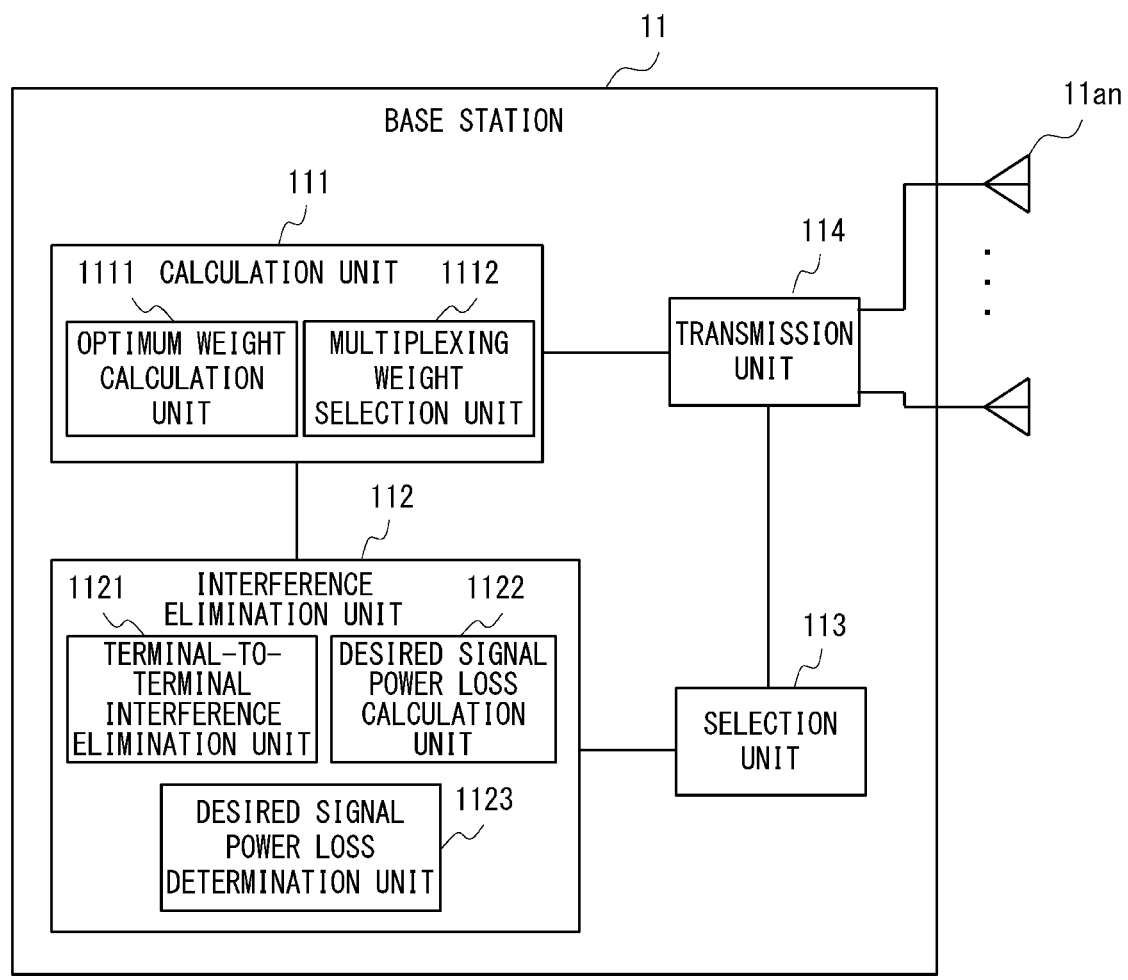
FIG. 1 is a block diagram illustrating a base station according to an example embodiment.

FIG. 1 is a block diagram illustrating the base station according to the example embodiment.

As shown in FIG. 1, a base station 11 according to the example embodiment includes a calculation unit 111, an interference elimination unit 112, a selection unit 113, and a transmission unit 114. The base station may be referred to as a radio base station.

The calculation unit 111 has an optimum weight calculation unit 1111 and a multiplexing weight selection unit 1112 for each layer of respective terminals. In a certain radio resource, the calculation unit 111 calculates a spatial multiplexing antenna weight $V_{JL}$ of an antenna 11an owned by the base station 11 based on information about spatial multiplexing terminals 12s that perform spatial multiplexing and Down Link (DL) channel information of the spatial multiplexing terminals 12s. The antenna 11an is a multi-element antenna.

The interference elimination unit 112 includes a terminal-to-terminal interference elimination unit 1121, a desired signal power loss calculation unit 1122, and a desired signal power loss determination unit 1123. The interference elimination unit 112 calculates an interference elimination antenna weight $W_{JL}$ that reduces interference power with respect to terminals other than the spatial multiplexing terminals 12s to a desired level or lower based on the spatial multiplexing antenna weight $V_{JL}$. The interference elimination unit 112 calculates a desired signal power loss $PL_{JL}$ of each of the spatial multiplexing terminals 12s based on the spatial multiplexing antenna weight $V_{JL}$ and the interference elimination antenna weight $W_{JL}$.

The selection unit 113 excludes a terminal 12p with excess loss in which the desired signal power loss $PL_{JL}$ is greater than a power loss threshold $P_{th}$ from the spatial multiplexing terminals 12s.

The transmission unit 114 transmits signals to the spatial multiplexing terminals 12s using the interference elimination antenna weight $W_{JL}$. The spatial multiplexing antenna weight $V_{JL}$, the interference elimination antenna weight $W_{JL}$, and the like may be collectively simply referred to as antenna weights.

A system according to the example embodiment is described.

Figure 2:
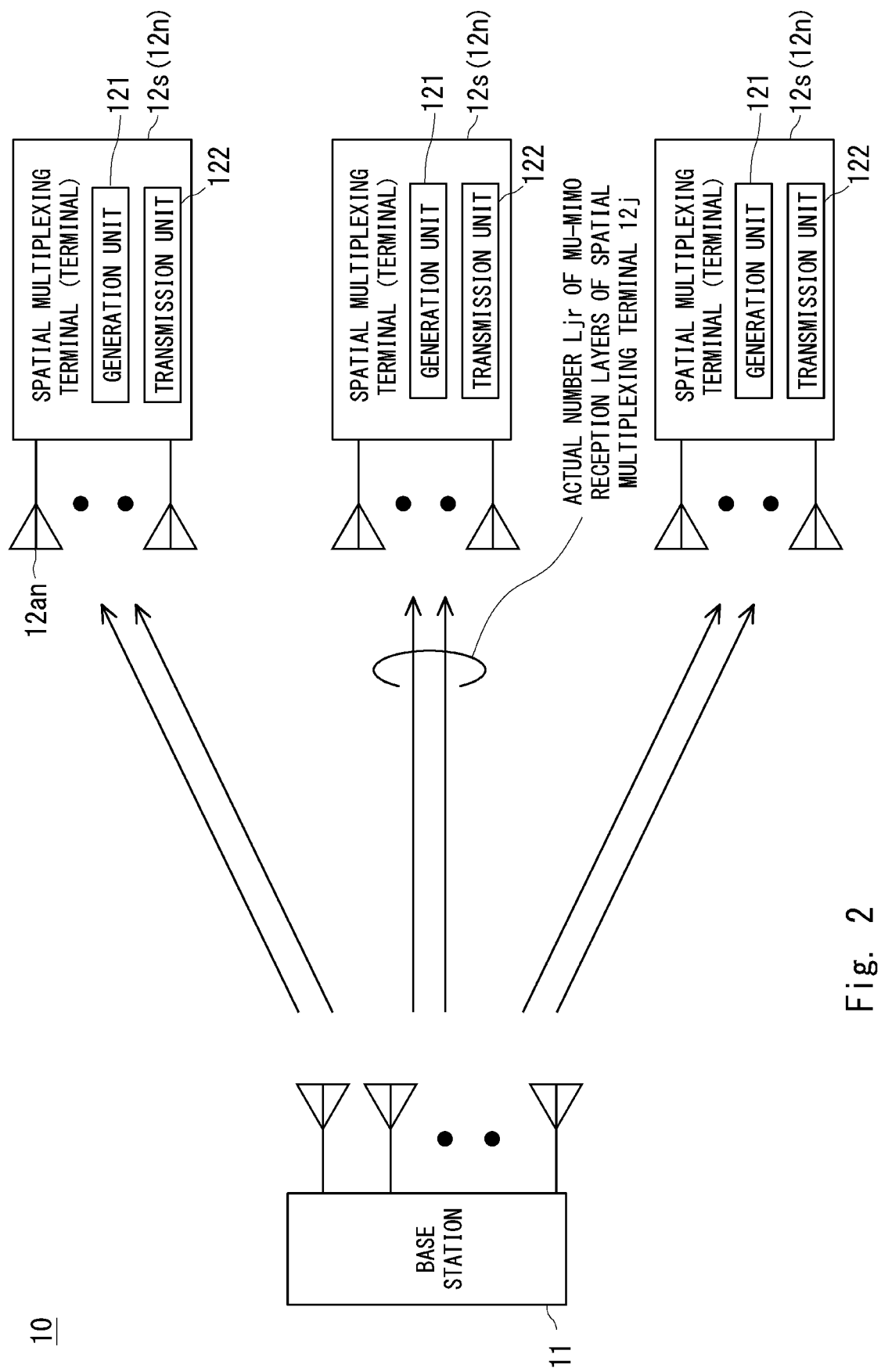
FIG. 2 is a block diagram illustrating a system according to the example embodiment.

FIG. 2 is a block diagram illustrating the system according to the example embodiment.

As shown in FIG. 2, a system 10 includes the base station 11, and the spatial multiplexing terminals 12s that perform spatial multiplexing with the base station 11. The base station 11 selects the spatial multiplexing terminal 12s that performs communication using a radio resource of a certain frequency and time from among a plurality of terminals 12n that perform communication with the base station 11.

The spatial multiplexing terminal 12s includes a generation unit 121 and a transmission unit 122. The generation unit 121 generates DL channel information based on DL control information received from the base station 11. The transmission unit 122 transmits the DL channel information to the base station 11.

The base station 11 communicates with the spatial multiplexing terminal 12s by Down Link Multi User-Multiple Input Multiple Output (DL MIMO) by using a radio resource of a certain frequency and time.

In FIG. 2, the total number of the plurality of terminals 12n is represented by a number I, and the number of spatial multiplexing terminals 12s that perform communication with the base station 11 using a certain radio resource by the DL MIMO is represented by a number J. That is, the number J is the number of spatial multiplexing terminals 12s capable of performing spatial multiplexing in a certain radio resource. Here, the relation between the number I and the number J can be expressed by the following Expression (1).

$$I \geq J \tag{1}$$

where the number J is an integer of one or greater.

Each of the spatial multiplexing terminals 12s connected to the base station 11 includes an antenna 12an. The antenna 12an includes at least one antenna element.

The relation between the number $N_{TX}$ of transmission antenna elements, which is the number of antennas 11an of the base station 11, and the maximum number K of layers that can perform transmission in the base station 11 can be expressed by the following Expression (2).

$$N_{TX} \geq K \tag{2}$$

where the number $N_{TX}$ of transmission antenna elements is an integer of two or greater. Note that the number $N_{TX}$ of transmission antenna elements may be the number of transmission units 114 of the base station 11.

Here, focusing on a j-th spatial multiplexing terminal 12j of the spatial multiplexing terminals 12s, the relation between j and the number J can be expressed by the following Expression (3).

$$J \geq j \geq 1 \tag{3}$$

Further, the relation between the number $N_{RX,j}$ of reception antenna elements of the spatial multiplexing terminal 12j of the spatial multiplexing terminals 12s and the maximum number $L_{jm}$ of layers that can perform reception in the spatial multiplexing terminal 12j can be expressed by the following Expression (4).

$$N_{RX,j} \geq L_{jm} \tag{4}$$

where the maximum number $L_{jm}$ of layers that can perform reception is an integer of one or greater.

Further, the relation between the maximum number $L_{jm}$ of layers that can perform reception in the spatial multiplexing terminal 12j and the actual number $L_{jr}$ of reception layers of the spatial multiplexing terminal 12j can be expressed by the following Expression (5).

$$L_{jm} \geq L_{jr} \tag{5}$$

Further, in a certain radio resource, the relation between the actual number $L_{jr}$ of reception layers of the spatial multiplexing terminal 12j and the maximum number K of layers that can perform transmission in the base station 11 can be expressed by the following Expression (6).

$$L_{1r} + L_{2r} + \ldots + L_{jr} + \ldots + L_{Jr} \leq K \tag{6}$$

Note that the maximum number of layers that can perform reception in each of the spatial multiplexing terminals 12s is equal to or smaller than the maximum number $L_{jm}$ of layers that can perform reception in the spatial multiplexing terminal 12j, and $L_{jm}$ is set to the maximum number L of layers that can perform reception. The actual number of reception layers of each of the spatial multiplexing terminals 12s is equal to or smaller than the maximum number L of layers that can perform reception, and may differ for each terminal. However, in the following description, in order to make explanations simple, it is assumed that the actual number of reception layers of each of the spatial multiplexing terminals 12s is equal to the maximum number L of layers that can perform reception.

An operation of the base station according to the example embodiment is described.

Figure 3A:
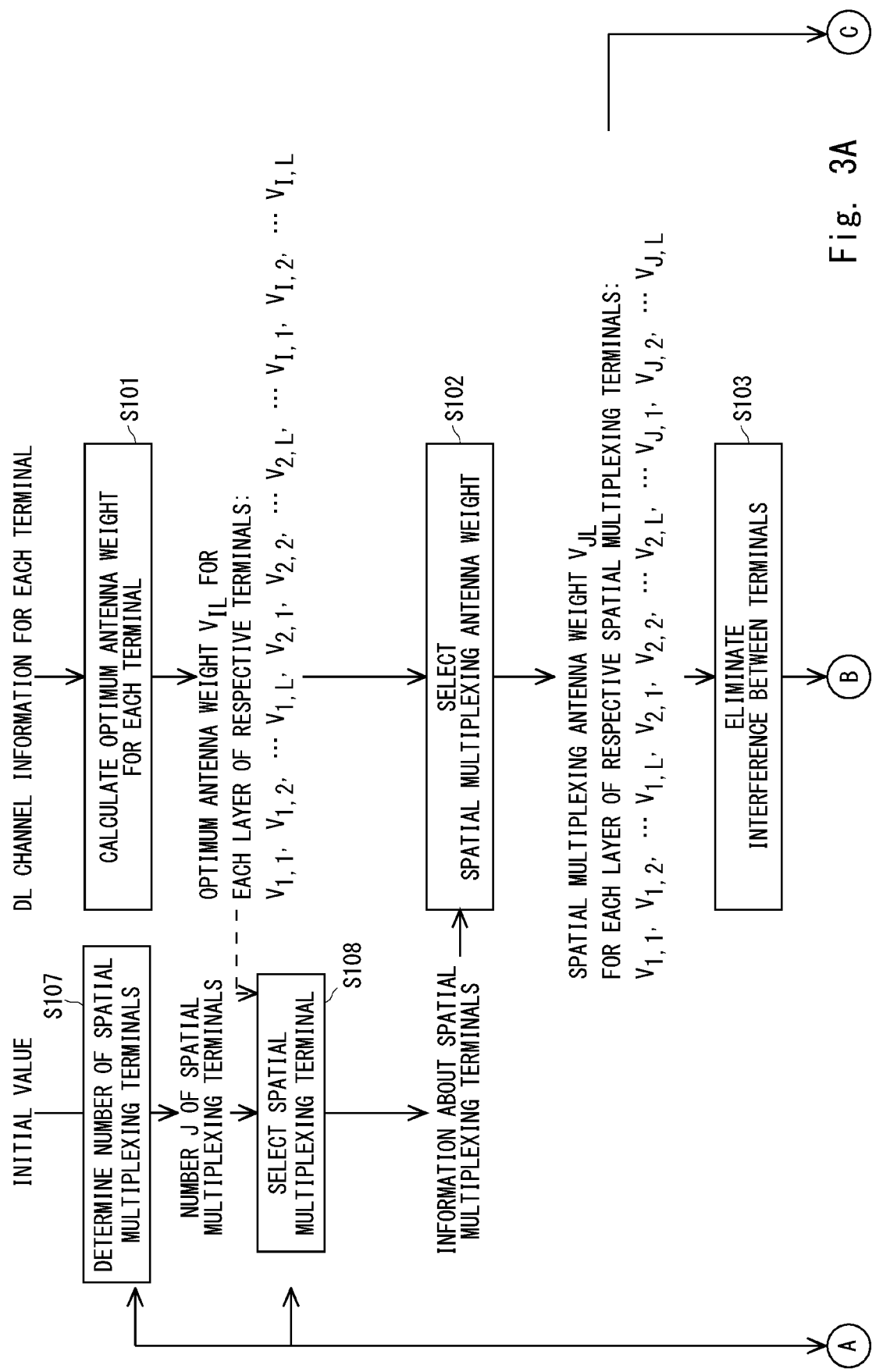
FIG. 3A is a flowchart illustrating an operation of the base station according to the example embodiment.

FIG. 3A is a flowchart illustrating an operation of the base station according to the example embodiment.

Figure 3B:
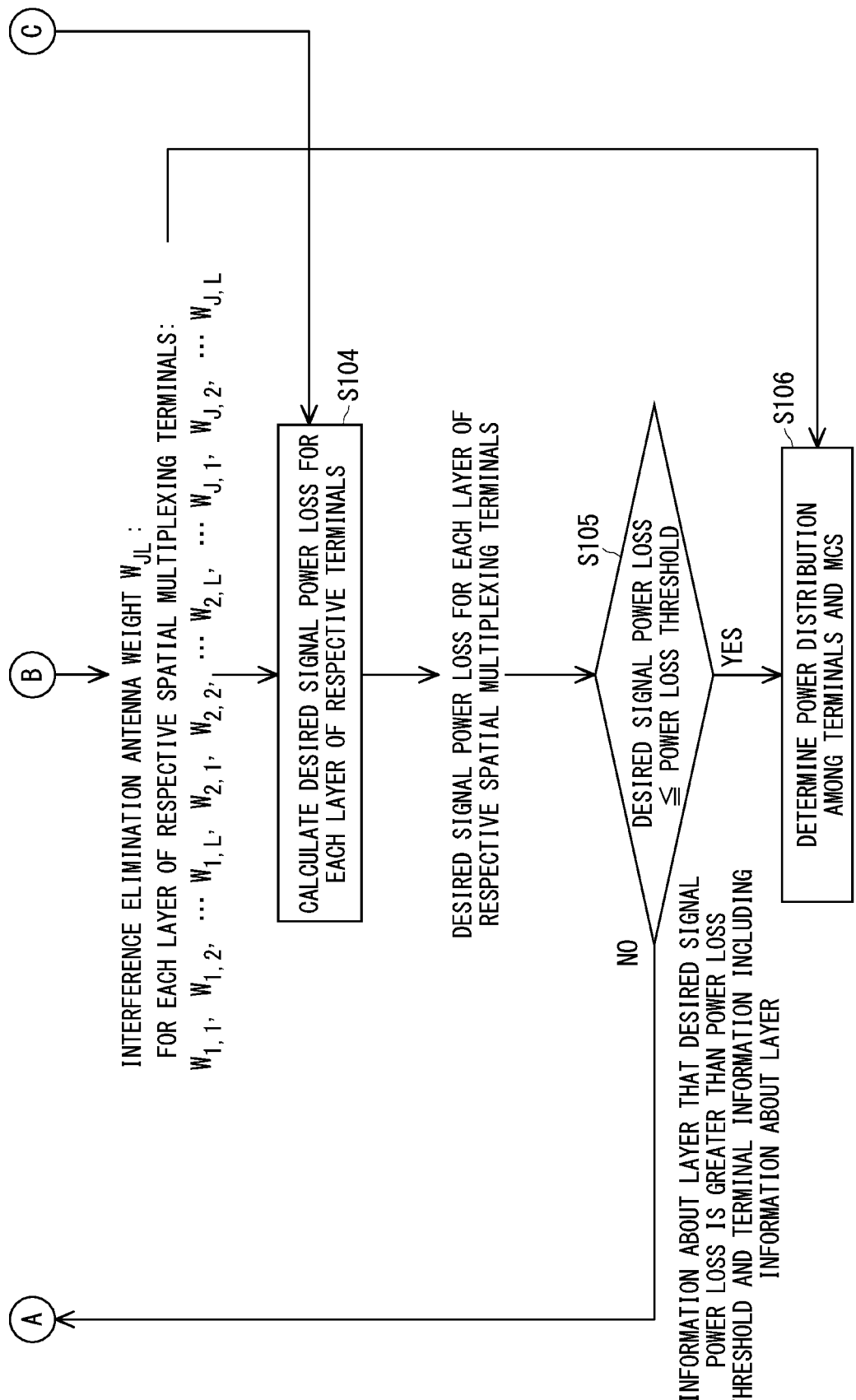
FIG. 3B is a flowchart illustrating an operation of the base station according to the example embodiment.

FIG. 3B is a flowchart illustrating an operation of the base station according to the example embodiment.

As shown in FIGS. 3A and 3B, the optimum weight calculation unit 1111 of the calculation unit 111 of the base station 11 receives Down Link (DL) channel information for each of the plurality of terminals 12n. The optimum weight calculation unit 1111 calculates and outputs an optimum antenna weight $V_{JL}$ for each layer of the plurality of respective terminals 12n of which the number is the number I (Step S101). The optimum antenna weight $V_{JL}$ can be represented as $V_{1,1}, V_{1,2}, \ldots V_{1,L}, V_{2,1}, V_{2,2}, \ldots V_{2,L}, V_{I,1}, V_{I,2}, \ldots V_{I,L}$.

However, it is assumed that the number of the plurality of terminals 12n connected to the base station 11 is I and the maximum number of layers that can perform reception in each of the plurality of terminals 12n is L. The dimension of the DL channel information is a value obtained by multiplying the number $N_{TX}$ of transmission antenna elements of the base station 11 by the number $N_{RX}$ of reception antenna elements of the plurality of terminals 12n.

In the case of a Time Division Duplex (TDD) system, the DL channel information can be acquired, for example, as follows.

First, each of the plurality of terminals 12n transmits a Sounding Reference Signal (SRS) to the base station 11. Next, the base station 11 calculates an estimate of an Up Link (UL) channel based on the SRSs. After that, the base station 11 uses the estimate of the UL channel as DL channel information based on the reciprocity of the propagation path. The estimate of the UL channel is referred to as a UL channel estimate.

Further, DL channel information can be acquired in the following manner either in the case of the TDD system or in the case of a Frequency Division Duplex (FDD) system.

First, the base station 11 transmits Channel State Information-Reference Signals (CSI-RSs) to the plurality of terminals 12n. Next, an estimate of the DL channel of the CSI-RS is calculated for each of the plurality of terminals 12n. After that, the plurality of terminals 12n generate DL channel information from the estimates of the DL channels and transmit the DL channel information to the base station 11. The estimate of the DL channel is referred to as a DL channel estimate.

The base station 11 may further include a reception unit for acquiring DL channel information.

Note that averaging processing may be performed on each of the UL channel estimate and the DL channel estimate in such a way that they are averaged in the frequency direction in accordance with the frequency bandwidth of the radio resource to be allocated, in order to improve the accuracy of the channel estimate.

Further, averaging processing may be performed on each of the UL channel estimate and the DL channel estimate in such a way that they are averaged in the time direction in accordance with the time width (the length in the time direction) of the radio resource to be allocated.

Further, when DL channel information is generated from the DL channel estimate, processing such as compression or discretization may be performed on the DL channel estimate to reduce the number of bits of the DL channel information.

The multiplexing weight selection unit 1112 of the calculation unit 111 receives the optimum antenna weight $V_{JL}$ for each layer of the plurality of respective terminals 12n output in Step S101 and information about the spatial multiplexing terminals 12s output in Step S108 described later. The information about the spatial multiplexing terminals 12s includes the number of the spatial multiplexing terminals 12s.

The multiplexing weight selection unit 1112 selects and outputs, based on the optimum antenna weight $V_{JL}$ for each layer of respective terminals and the information about the spatial multiplexing terminals 12s, the spatial multiplexing antenna weight $V_{JL}$ for each layer of the respective number J spatial multiplexing terminals 12s (Step S102). The spatial multiplexing antenna weight $V_{JL}$ can be represented as $V_{1,1}$, $V_{1,2}$, ... $V_{1,L}$, $V_{2,1}$, $V_{2,2}$, ... $V_{2,L}$, ... $V_{J,1}$, $V_{J,2}$, ... $V_{J,L}$.

Note that the number of spatial multiplexing terminals 12s is J, and the actual number of layers received in each of the spatial multiplexing terminals 12s is L.

The terminal-to-terminal interference elimination unit 1121 of the interference elimination unit 112 receives the spatial multiplexing antenna weight $V_{JL}$, eliminates the interference between the terminals, and calculates and outputs an interference elimination antenna weight $W_{JL}$ for each layer of the respective spatial multiplexing terminals 12s (Step S103). The interference elimination antenna weight $W_{JL}$ can be represented as $W_{1,1}$, $W_{1,2}$, ... $W_{1,L}$, $W_{2,1}$, $W_{2,2}$, ... $W_{2,L}$, ... $W_{J,1}$, $W_{J,2}$, ... $W_{J,L}$.

Note that the number of spatial multiplexing terminals 12s is J, and the actual number of layers received by each of the spatial multiplexing terminals 12s is L.

The terminal-to-terminal interference elimination unit 1121 reduces transmission power of the spatial multiplexing terminal 12s so as to reduce the interference power to a desired level or lower, for example, by using at least one of a Zero Forcing (ZF) method and a Minimum Mean Square Error (MMSE) method. By doing so, the interference between terminals are eliminated.

The desired signal power loss calculation unit 1122 calculates and outputs a desired signal power loss $PL_{JL}$ for each layer of the respective spatial multiplexing terminals 12s based on the interference elimination antenna weight $W_{JL}$ and the spatial multiplexing antenna weight $V_{JL}$ (Step S104). The desired signal power loss $PL_{JL}$ can be represented as $PL_{1,1}$, $PL_{1,2}$, ... $PL_{1,L}$, $PL_{2,1}$, $PLV_{2,2}$, ... $PL_{2,L}$, ... $PL_{J,1}$, $PL_{J,2}$, ... $PL_{J,L}$.

Note that the number of spatial multiplexing terminals 12s is J, and the actual number of reception layers of each of the spatial multiplexing terminals 12s is L.

Here, the spatial multiplexing antenna weight $V_{JL}$ corresponds to the antenna weight of DL after Maximal Ratio Combining (MRC). That is, the spatial multiplexing antenna weight $V_{JL}$ is an antenna weight before the interference power between the terminals is eliminated. On the other hand, the interference elimination antenna weight $W_{JL}$ is an antenna weight after the interference power between the terminals is eliminated. Therefore, the interference elimination antenna weight $W_{JL}$ corresponds to the antenna weight of the DL calculated using a method for calculating the actual antenna weight of the DL.

The desired signal power loss calculation unit 1122 calculates a beam gain in a peak direction of a directivity pattern calculated from the spatial multiplexing antenna weight $V_{JL}$, and defines the calculated beam gain as a spatial multiplexing beam gain $G_{pv}$. The desired signal power loss calculation unit 1122 calculates a beam gain of a directivity pattern calculated from the interference elimination antenna weight $W_{JL}$ in the peak direction of the directivity pattern calculated from the spatial multiplexing antenna weight $V_{JL}$, and defines the calculated beam gain as an interference beam gain $G_{pw}$. There is a difference between the spatial multiplexing beam gain $G_{pv}$ and the interference beam gain $G_{pw}$ in the same direction, that is, in the peak direction of the directivity pattern calculated from the spatial multiplexing antenna weight $V_{JL}$. The desired signal power loss calculation unit 1122 calculates the difference between the spatial multiplexing beam gain $G_{pv}$ and the interference beam gain $G_{pw}$ as the desired signal power loss $PL_{JL}$. The directivity pattern may be referred to as a directional beam or simply a beam.

An operation of the multiplexing weight selection unit 1112 in Step S102, an operation of the terminal-to-terminal interference elimination unit 1121 in Step S103, and an operation of the desired signal power loss calculation unit 1122 in Step S104 are specifically described below.

The multiplexing weight selection unit 1112 calculates the spatial multiplexing antenna weight $V_{JL}$ of the antenna 11an of the base station 11 so that the reception power of the target spatial multiplexing terminal 12s becomes maximum in the absence of other terminals (the interference power is zero) for each spatial multiplexing terminal 12s as the directivity pattern of the antenna 11an of the base station 11. For example, when the base station 11 and the target spatial multiplexing terminal 12s are in a Line Of Sight (LOS) environment, the multiplexing weight selection unit 1112 calculates the spatial multiplexing antenna weight $V_{JL}$ so that the peak (the maximum value) of the directivity pattern is directed to the direction of the target spatial multiplexing terminal 12s. In other words, the multiplexing weight selection unit 1112 calculates the spatial multiplexing antenna weight $V_{JL}$ so that the power transmitted from the base station 11 which the target spatial multiplexing terminal 12s receives becomes maximum in the absence of other terminals.

The terminal-to-terminal interference elimination unit 1121 collects the spatial multiplexing antenna weight $V_{JL}$ which is the spatial multiplexing antenna weight $V_{JL}$ calculated by the multiplexing weight selection unit 1112 and is individually calculated for the number J spatial multiplexing terminals 12s in a certain radio resource. After that, the terminal-to-terminal interference elimination unit 1121 controls the spatial multiplexing antenna weight $V_{JL}$ so that the terminals do not interfere with each other and calculates the interference elimination antenna weight $W_{JL}$. In other words, the multiplexing weight selection unit 1112 controls, in the presence of other terminals, the spatial multiplexing antenna weight $V_{JL}$ so as to reduce the interference power to the other terminals to a desired level or lower and calculates the interference elimination antenna weight $W_{JL}$.

The desired signal power loss calculation unit 1122 calculates, as the desired signal power loss $PL_{JL}$, a difference between a desired signal transmission power based on the spatial multiplexing antenna weight $V_{JL}$ calculated by the multiplexing weight selection unit 1112 and a desired signal transmission power based on the interference elimination antenna weight $W_{JL}$ calculated by the terminal-to-terminal interference elimination unit 1121.

The desired signal power loss determination unit 1123 of the interference elimination unit 112 determines whether the desired signal power loss $PL_{JL}$ for each layer of the respective spatial multiplexing terminals 12s is equal to or less than the power loss threshold $P_{th}$ (Step S105).

When the desired signal power loss $PL_{JL}$ is equal to or less than the power loss threshold $P_{th}$ in all the layers (Yes in Step S105), the base station 11 determines the power distribution among the terminals and a Modulation and Coding Scheme (MCS) of DL transmission data (Step S106).

When the desired signal power loss $PL_{JL}$ in at least one layer is greater than the power loss threshold $P_{th}$ (No in Step S105), the base station 11 outputs layer information and terminal information including the layer information to Steps S106 and S107 described later. The terminal information includes a terminal number.

Note that the power loss threshold $P_{th}$ may be a fixed value set in advance or may dynamically vary in accordance with the operating environment.

The process in Step S106 is performed when the desired signal power loss $PL_{JL}$ is equal to or less than the power loss threshold $P_{th}$ in all the layers (Yes in Step S105). In Step S106, the interference elimination antenna weight $W_{JL}$ is received, power is distributed among the terminals and among the layers, and the Modulation and Coding Scheme of the DL transmission data is determined.

There is no limitation on a method for distributing power among the terminals and among the layers. Examples of the method for distributing power include a method for making transmission power of all the layers of all the spatial multiplexing terminals 12s equal, a method for distributing transmission power in proportion to a signal quality of each layer expected when spatial multiplexing is performed, and a method for distributing transmission power so that respective signal qualities of the layers expected when spatial multiplexing is performed become equal. The signal quality is, for example, a Signal to Interference Ratio (SIR).

There is no limitation on a method for determining the Modulation and Coding Scheme of the DL transmission data. As the method for determining the Modulation and Coding Scheme, for example, a method for determining a modulation scheme and a coding rate based on the signal quality of each layer expected when spatial multiplexing is performed can be employed. Alternatively, for example, a method for determining a current modulation scheme and coding rate based on the modulation scheme, the coding rate, and the reception success rate of the past DL transmission data can be employed.

The selection unit 113 of the base station 11 receives an initial value, layer information when the desired signal power loss $PL_{JL}$ is greater than the power loss threshold $P_{th}$ (No in Step S105), and terminal information including the layer information, and outputs the number J of spatial multiplexing terminals 12s (Step S107).

The initial value of the number J in the selection unit 113 can be set to any value equal to or smaller than the maximum number K of layers that can perform transmission in the base station 11. For example, "the maximum number K of layers that can perform transmission/the maximum number L of layers that can perform reception" can be set.

There is no limitation on a method for determining the number J of spatial multiplexing terminals 12s. As the method for determining the number J, for example, a method in which a predetermined initial value is set as a fixed value and the initial value is used as the number J as it is can be employed. Alternatively, for example, a method in which the number of terminals 12p with excess loss in which the desired signal power loss $PL_{JL}$ is greater than the power loss threshold $P_{th}$ is subtracted from the latest number J of spatial multiplexing terminals 12s and the number thus obtained is used as the current (new) number J can be employed.

The selection unit 113 receives the number J of spatial multiplexing terminals 12s, layer information when the desired signal power loss $PL_{JL}$ is greater than the power loss threshold $P_{th}$ (No in Step S105), and terminal information including the layer information. The selection unit 113 outputs information about the spatial multiplexing terminals 12s to the multiplexing weight selection unit 1112 based on the received information pieces (Step S108). The information about the spatial multiplexing terminals 12s includes the numbers thereof.

In Step S108, the terminal 12p with excess loss in which the desired signal power loss $PL_{JL}$ is greater than the power loss threshold $P_{th}$ is excluded from the latest set of the spatial multiplexing terminals 12s and this set is set as the current (new) set of the spatial multiplexing terminals 12s. The terminal to be excluded is the terminal 12p with excess loss in which the desired signal power loss $PL_{JL}$ is greater than the power loss threshold $P_{th}$.

A radio resource different from the radio resource allocated to the spatial multiplexing terminal 12s is allocated to the terminal excluded in Step S108 in accordance with a multiplexing terminal selection method M.

It should be noted that examples of the multiplexing terminal selection method M include a random selection method, a round-robin method, a Proportional Fairness (PF) method, and a Max C/I method. The selection unit 113 selects the spatial multiplexing terminal 12s from among the plurality of terminals 12n that communicate with the base station 11 by using one of the random selection method, the round-robin method, the Proportional Fairness (PF) method, and the Max C/I method.

Further, in addition to the aforementioned methods, the multiplexing terminal selection method M may use, for example, the optimum antenna weight $V_{IL}$ for each layer of respective terminals.

Further, when the selection unit 113 determines that the number of excluded terminals is large, it may reset the set of the spatial multiplexing terminals 12s. Then, the selection unit 113 may select a number of spatial multiplexing terminals 12s equal to the initial number of spatial multiplexing terminals 12s from among the plurality of terminals 12n in accordance with the multiplexing terminal selection method M.

There is no limitation on a criterion for determining that the number of excluded terminals is large. As the criterion for the determination, for example, a half or a quarter of the initial number of spatial multiplexing terminals 12s may be used as a criterion. When the number of spatial multiplexing terminals 12s is a half or a quarter or more of the initial number thereof, the selection unit 113 determines that the number of excluded terminals is large.

Further, if there are a plurality of terminals 12p with excess loss in which the desired signal power loss $PL_{JL}$ is greater than the power loss threshold $P_{th}$, the selection unit 113 may exclude the plurality of terminals 12p with excess loss from the plurality of terminals 12n, select new terminals from among the remaining terminals based on the multiplexing terminal selection method M, and add the selected terminals as the spatial multiplexing terminals 12s until the number of spatial multiplexing terminals 12s becomes J.

Further, the selection unit 113 may select new terminals equal in number to the excluded terminals 12p with excess loss from among the plurality of terminals 12n based on the multiplexing terminal selection method M, and add the selected new terminals as the spatial multiplexing terminals 12s.

Further, when there are a plurality of terminals 12p with excess loss in which the desired signal power loss $PL_{JL}$ is greater than the power loss threshold $P_{th}$, the selection unit 113 selects one terminal from among the plurality of terminals 12p with excess loss and excludes the selected one terminal from the spatial multiplexing terminals 12s. After that, the selection unit 113 may select a new terminal from among the plurality of terminals 12n based on the multiplexing terminal selection method M and add the selected new terminal as the spatial multiplexing terminal 12s. In this case, the excluded terminals may be candidates for the spatial multiplexing terminals in another radio resource (frequency/time resources).

In the example shown in FIG. 3, after the optimum antenna weight $V_{IL}$ for each layer of all the plurality of respective terminals 12n is calculated (Step S101), the optimum antenna weight $V_{IL}$ corresponding to the spatial multiplexing terminal 12s is selected from among the calculated optimum antenna weights $V_{IL}$ for each layer of the respective terminals and the spatial multiplexing antenna weight $V_{JL}$ is thus obtained (Step S104). The example embodiment is not limited thereto. In the example embodiment, after the spatial multiplexing terminals 12s are selected from among the plurality of terminals 12n, the optimum antenna weight for each layer of the respective terminals is calculated only for the selected spatial multiplexing terminals 12s, and the calculated optimum antenna weight may be set as the spatial multiplexing antenna weight $V_{JL}$.

The base station 11 according to the example embodiment controls the antenna weight of the antenna 11an and reduces the desired signal transmission power to the spatial multiplexing terminal 12s, in order to reduce the interference power with respect to other terminals to a desired level or lower. At this time, the base station 11 excludes the terminal 12p with excess loss in which the desired signal power loss $PL_{JL}$ is greater than the power loss threshold $P_{th}$ from the spatial multiplexing terminals 12s. That is, the base station 11 excludes the terminal 12p with excess loss, which greatly reduces the desired signal transmission power, from the spatial multiplexing terminals 12s.

By the above configuration, a terminal to which a sufficient transmission power cannot be allocated or which causes a decrease in transmission power to other terminals that perform spatial multiplexing is excluded from the spatial multiplexing terminals 12s, whereby the base station 11 can improve Down Link Multi User-Multiple Input Multiple Output (DL MU-MIMO) characteristics. The same applies to the system 10.

As a result, according to the example embodiment, it is possible to provide a base station and a system capable of improving the DL MU-MIMO characteristics.

Further, by excluding the terminal 12p with excess loss in which the desired signal power loss $PL_{JL}$ is greater than the power loss threshold $P_{th}$ from the spatial multiplexing terminals 12s, the base station 11 according to the example embodiment reduces the amount of computation in spatial multiplexing, reduces the size of the circuit, and reduces the processing time (the characteristics of the DL MU-MIMO can be improved even when a spatial multiplexing terminal selection method other than the method for obtaining an optimum solution is applied). In the method performed by the base station 11, the amount of computation and the scale of the circuit are smaller and the processing time is shorter than, for example, in a spatial multiplexing terminal selection method for obtaining an optimum solution in which a combination of low cross-correlation DL channels is selected from all combinations of terminals connected to the base station.

Note that although the present disclosure has been described as a hardware configuration in the above-described example embodiment, the present disclosure is not limited thereto. In the present disclosure, it is also possible to implement processing of each component by causing a Central Processing Unit (CPU) to execute a computer program.

In the above-described example embodiment, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g., magneto-optical disks), Compact Disc Read Only Memory (CD-ROM), CD-R, CD-R/W, and semiconductor memories (such as mask ROM, Programmable ROM (PROM), Erasable PROM (EPROM), flash ROM, Random Access Memory (RAM), etc.). The program may be provided to a computer using any type of transitory computer readable media. Examples of transitory computer readable media include electric signals, optical signals, and electromagnetic waves. Transitory computer readable media can provide the program to a computer via a wired communication line (e.g., electric wires, and optical fibers) or a wireless communication line.

Note that the present disclosure is not limited to the above-described example embodiment and may be modified as appropriate without departing from the spirit of the present disclosure.

While the present disclosure has been described with reference to the example embodiment, the present disclosure is not limited to the above-described example embodiment. Various modifications that can be understood by those skilled in the art can be made to the configurations and the details of the present disclosure within the scope of the present disclosure.

This application is based upon and claims the benefit of priority from Japanese patent application No. 2018-180606, filed on Sep. 26, 2018, the disclosure of which is incorporated herein in its entirety by reference.

REFERENCE SIGNS LIST

10 SYSTEM
11 BASE STATION
11an ANTENNA
111 CALCULATION UNIT
1111 OPTIMUM WEIGHT CALCULATION UNIT
1112 MULTIPLEXING WEIGHT SELECTION UNIT
112 INTERFERENCE ELIMINATION UNIT
1121 TERMINAL-TO-TERMINAL INTERFERENCE ELIMINATION UNIT
1122 DESIRED SIGNAL POWER LOSS CALCULATION UNIT
1123 DESIRED SIGNAL POWER LOSS DETERMINATION UNIT
113 SELECTION UNIT
114 TRANSMISSION UNIT
12n PLURALITY OF TERMINALS
12an ANTENNA
12s SPATIAL MULTIPLEXING TERMINAL
12p TERMINAL WITH EXCESS LOSS
121 GENERATION UNIT
122 TRANSMISSION UNIT
I, J NUMBER
$N_{TX}$ NUMBER OF TRANSMISSION ANTENNA ELEMENTS
$N_{RXj}$, $N_{RX}$ NUMBER OF RECEPTION ANTENNA ELEMENTS
K MAXIMUM NUMBER OF LAYERS THAT CAN PERFORM TRANSMISSION
$L_{jm}$, L MAXIMUM NUMBER OF LAYERS THAT CAN PERFORM RECEPTION
$L_{jr}$, $L_{Jr}$ ACTUAL NUMBER OF RECEPTION LAYERS
M MULTIPLEXING TERMINAL SELECTION METHOD
$PL_{JL}$ DESIRED SIGNAL POWER LOSS
$P_{th}$ POWER LOSS THRESHOLD
$G_{pv}$ SPATIAL MULTIPLEXING BEAM GAIN
$G_{pw}$ INTERFERENCE BEAM GAIN
$V_{IL}$ OPTIMUM ANTENNA WEIGHT FOR EACH LAYER OF RESPECTIVE TERMINALS
$V_{JL}$ SPATIAL MULTIPLEXING ANTENNA WEIGHT
$W_{JL}$ INTERFERENCE ELIMINATION ANTENNA WEIGHT

What is claimed is:

1. A base station comprising:
at least one memory storing instructions, and
at least one processor configured to execute the instructions to;
calculate, in a certain radio resource, a spatial multiplexing antenna weight of each of a plurality of antennas owned by the base station based on information about at least one spatial multiplexing terminal configured to perform spatial multiplexing and Down Link (DL) channel information of the at least one spatial multiplexing terminal;
calculate an interference elimination antenna weight that reduces interference power with respect to a terminal other than the at least one spatial multiplexing terminal to a desired level or lower based on the spatial multiplexing antenna weight, and calculate a desired signal power loss of the at least one spatial multiplexing terminal based on the spatial multiplexing antenna weight and the interference elimination antenna weight;
exclude, from the at least one spatial multiplexing terminal, any spatial multiplexing terminal with excess loss in which the desired signal power loss is greater than a power loss threshold; and
transmit a signal to the at least one spatial multiplexing terminal,
wherein an initial number of the at least one spatial multiplexing terminal is set in advance to a value obtained by dividing a maximum number of layers that can perform transmission in the base station by a maximum number of layers that can perform reception in the at least one spatial multiplexing terminal.

2. The base station according to claim 1, wherein the at least one processor is configured to calculate:
a spatial multiplexing beam gain in a peak direction of a directivity pattern calculated from the spatial multiplexing antenna weight;
an interference beam gain of a directivity pattern calculated from the interference elimination antenna weight in the peak direction of the directivity pattern calculated from the spatial multiplexing antenna weight; and
a difference between the spatial multiplexing beam gain and the interference beam gain as the desired signal power loss.

3. The base station according to claim 1, wherein the at least one processor is configured to select the at least one spatial multiplexing terminal from among a plurality of terminals configured to communicate with the base station by using one of a random selection method, a round-robin method, a Proportional Fairness (PF) method, and a Max C/I method.

4. The base station according to claim 1, wherein the at least one processor is configured to reduce transmission power of the at least one spatial multiplexing terminal so as to reduce the interference power to a desired level or lower by using at least one of a Zero Forcing (ZF) method and a Minimum Mean Square Error (MMSE) method.

5. A base station comprising:
at least one memory storing instructions, and
at least one processor configured to execute the instructions to;
calculate, in a certain radio resource, a spatial multiplexing antenna weight of each of a plurality of antennas owned by the base station based on information about at least one spatial multiplexing terminal configured to perform spatial multiplexing and Down Link (DL) channel information of the at least one spatial multiplexing terminal;

calculate an interference elimination antenna weight that reduces interference power with respect to a terminal other than the at least one spatial multiplexing terminal to a desired level or lower based on the spatial multiplexing antenna weight, and calculate a desired signal power loss of the at least one spatial multiplexing terminal based on the spatial multiplexing antenna weight and the interference elimination antenna weight;

exclude, from the at least one spatial multiplexing terminal, any spatial multiplexing terminal with excess loss in which the desired signal power loss is greater than a power loss threshold; and transmit a signal to the at least one spatial multiplexing terminal, wherein the at least one processor is configured to select the at least one spatial multiplexing terminal from among a plurality of terminals configured to communicate with the base station by using one of a random selection method, a round-robin method, a Proportional Fairness (PF) method, and a Max C/I method, and the at least one processor is configured to select one or more new terminals equal in number to the at least spatial multiplexing terminal that have been excluded, based on a multiplexing terminal selection method, and add the selected new terminals to the at least one spatial multiplexing terminal.

6. A system comprising a base station and at least one spatial multiplexing terminal configured to perform spatial multiplexing with the base station, wherein the base station comprises:

at least one memory for the base station storing instructions, and at least one processor for the base station configured to execute the instructions to;

calculate, in a certain radio resource, a spatial multiplexing antenna weight of each of a plurality of antennas owned by the base station based on information about the at least one spatial multiplexing terminal and Down Link (DL) channel information of the at least one spatial multiplexing terminal;

calculate an interference elimination antenna weight that reduces interference power with respect to a terminal other than the at least one spatial multiplexing terminal to a desired level or lower based on the spatial multiplexing antenna weight, and calculate a desired signal power loss of the at least one spatial multiplexing terminal based on the spatial multiplexing antenna weight and the interference elimination antenna weight;

exclude, from the at least one spatial multiplexing terminal, any spatial multiplexing terminal with excess loss in which the desired signal power loss is greater than a power loss threshold; and transmit a signal to the at least one spatial multiplexing terminal, wherein an initial number of the at least one spatial multiplexing terminal is set in advance to a value obtained by dividing a maximum number of layers that can perform transmission in the base station by a maximum number of layers that can perform reception in the at least one spatial multiplexing terminal, and the at least one spatial multiplexing terminal comprises:

at least one memory for the terminal storing instructions, and at least one processor for the terminal configured to execute the instructions to;

generate the DL channel information based on DL control information received from the base station; and transmit the DL channel information to the base station.

7. The system according to claim 6, wherein the at least one processor for the base station is configured to calculate:

a spatial multiplexing beam gain in a peak direction of a directivity pattern calculated from the spatial multiplexing antenna weight;

an interference beam gain of a directivity pattern calculated from the interference elimination antenna weight in the peak direction of the directivity pattern calculated from the spatial multiplexing antenna weight; and a difference between the spatial multiplexing beam gain and the interference beam gain as the desired signal power loss.

8. A method comprising:

calculating, in a certain radio resource, a spatial multiplexing antenna weight of each of a plurality of antennas owned by a base station based on information about at least one spatial multiplexing terminal configured to perform spatial multiplexing and Down Link (DL) channel information of the at least one spatial multiplexing terminal;

calculating an interference elimination antenna weight that reduces interference power with respect to a terminal other than the at least one spatial multiplexing terminal to a desired level or lower based on the spatial multiplexing antenna weight;

calculating a desired signal power loss of the at least one spatial multiplexing terminal based on the spatial multiplexing antenna weight and the interference elimination antenna weight;

excluding, from the at least one spatial multiplexing terminal, any spatial multiplexing terminal with excess loss in which the desired signal power loss is greater than a power loss threshold; and transmitting a signal to the at least one spatial multiplexing terminal, wherein an initial number of the at least one spatial multiplexing terminal is set in advance to a value obtained by dividing a maximum number of layers that can perform transmission in the base station by a maximum number of layers that can perform reception in the at least one spatial multiplexing terminal.

* * * * *